July 3, 1951

A. CRESSWELL 2,558,735

METHOD OF FORMING DYED SHAPED ARTICLES FROM
ACRYLONITRILE POLYMERIZATION PRODUCTS

Filed Aug. 30, 1950

INVENTOR
ARTHUR CRESSWELL,
BY
Harold L. Kauffman
ATTORNEY

INVENTOR
ARTHUR CRESSWELL,
BY
Harold L. Kauffman
ATTORNEY

Patented July 3, 1951

2,558,735

UNITED STATES PATENT OFFICE 2,558,735

METHOD OF FORMING DYED SHAPED ARTICLES FROM ACRYLONITRILE POLYMERIZATION PRODUCTS

Arthur Cresswell, Stamford, Conn., assignor to American Cyanamid Company, New York, N. Y., a corporation of Maine Application August 30, 1950, Serial No. 182,296

28 Claims. (Cl. 18—47.5)

This application is a continuation-in-part of my copending application Serial No. 772,202, filed September 4, 1947, and now abandoned.

This invention relates to the treatment of polymeric compositions and more particularly to certain new and useful improvements in methods of treating, specifically dyeing, polymers and copolymers (thermoplastic copolymers) of acrylonitrile. The invention especially is concerned with methods of producing dyed, shaped products, for example in the form of filaments (mono- and multifilaments), rods, tubes, films, ribbons, sheets, etc., from undyed, soluble, thermoplastic products of polymerization of a polymerizable mass comprising mainly acrylonitrile.

Various methods of producing filaments, films and other shaped articles from polyacrylonitrile (polymeric acrylonitrile) and from thermoplastic copolymers or interpolymers of a major proportion of acrylonitrile and a minor proportion of another monomer or monomers heretofore have been suggested. For example, in Rein U. S. Patent No. 2,117,210 it is proposed that polyacrylonitrile be dissolved in a quaterary ammonium compound, more particularly a pyridinium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metal) salts, e. g., the chlorides, bromides, iodides, thiocyanates, perchlorates and nitrates, and that the resulting solutions be used in the manufacture of threads, films, etc. In neither of these patents is there any teaching or suggestion of any means of producing any dyed polymers or copolymers of acrylonitrile. Various organic solvent solutions of polyacrylonitrile and copolymers of at least 85% by weight of acrylonitrile with another monomer are disclosed in U. S. Patents 2,404,713–728, and also the use of such solutions in forming films, filaments, etc., therefrom. In most of these latter patents the aforementioned Rein patents are referred to, as well as the difficulties encountered when effort was made to produce useful filaments and other shaped articles from polyacrylonitrile solutions of the kind proposed by Rein.

The invention disclosed and claimed in my copending application Serial No. 772,200, filed September 4, 1947, is based on my discovery that useful films, filaments, threads and other shaped articles, which are capable of being dyed, can be produced from acrylonitrile polymerization products of the kind described broadly in the second paragraph of this specification and more specifically in the aforementioned application and in the aforesaid patents, as well as hereinafter, by precipitating or coagulating the polymerization product in approximately its desired shape from a water-coagulable solution thereof (e. g. concentrated aqueous salt solutions of the kind disclosed by Rein in his Patent No. 2,140,921), the precipitation being effected by contacting the said solution with a cold liquid coagulant comprising water, more particularly, such a coagulant which is at a temperature not substantially exceeding +10° C. This coagulant is a non-solvent for the polymerization product but will dissolve the solvent in which the said product is dissolved. Surprisingly it was found that by keeping the temperature of the aqueous coagulating bath at or below about +10° C., e. g., within the range of —15° C. to about +5° C., the precipitated gels are clear or substantially clear, tough, ductile and, in filament, thread or other form, can be stretched to orient the molecules, thereby increasing the cohesiveness, tensile strength, toughness, resilience and otherwise improving the properties of the finished product. In marked contrast, if temperatures materially above +10° C. be employed, e. g., temperatures of the order of 20° to 50° C. or higher, the precipitated gels in general are hazy or opaque, weak, friable, have little or no toughness or ductility and are not adapted for stretching to orient the molecules and thereby improve the properties of the dried material.

The invention disclosed and claimed in my aforementioned copending application Serial No. 772,200 is based on my further discovery that the shaped, precipitated gels, e. g., extruded, water-swollen filaments, which have been formed in a cold, liquid coagulant comprising water at a low temperature of the order of that mentioned in the preceding paragraph can be materially improved in properties by subjecting the precipitated material in wet, swollen state to tension, as by stretching, in contact with moisture or water and at an elevated temperature, specifically at a temperature within the range of about 70° C. to about 110° C. Advantageously water at 70° C. to 100° C., preferably at 90° C. to 100° C., is the fluid medium with which the gelled or precipitated fiber or other product is contacted during the stretching operation, but if temperatures above 100° C., e. g., 110° C., are desirable, then an atmosphere of saturated steam may be employed. For optimum results during stretching it is important that moisture or water be present. By thus wet stretching the precipitated product, more particularly to an extent at least twice its original length (that is, at least 100%) and preferably from 3 to 20 or 30 or more times its original length, the molecules are oriented along the fiber axis and a product having increased tensile strength, pronounced fibrillation, toughness, resilience and other improved properties is obtained.

The dyeing of polymeric acrylonitrile and thermoplastic copolymers thereof, e. g., in the form of films, filaments, threads, yarns, etc., has been a difficult problem and, to the best of my knowledge and belief, no satisfactory or practical method of dyeing such polymerization products was known prior to my invention.

The present invention is based on my discovery that dyed, thermoplastic products of polymerization of a polymerizable mass comprising mainly acrylonitrile, e. g., polymeric acrylonitrile, can be produced by contacting a water-swollen mass of such a polymerization product with an acetate or other dye, e. g., by immersing such a mass in an aqueous bath containing the dye. (As is well known in the art of dyeing, acetate dyes are those dyes which are effective in dyeing cellulose acetate and constitute a well-recognized class of dyes which are commercially available.)

The invention is based on my further discovery that shaped, precipitated gels or water-swollen structures or masses which have been produced as described briefly in the fourth and fifth paragraphs of this specification and more fully in my aforementioned copending application Serial No. 772,200 are particularly adaptable to dyeing with an acetate or other dye. It was quite surprising and unexpected that such gels, both oriented and unoriented, would be especially amenable to dyeing, since the products, e. g., filaments, obtained by completely drying such gels as well as those resulting from dry spinning or casting an organic solvent solution of the polymerization product are often undyed by, for example, an acetate dye under the same conditions employed in dyeing the gel. In other words, the absorption of acetate dye by such products is often either nil or the rate thereof is extremely low, and it normally would be expected that this also would be true with respect to the water-swollen bodies, especially those which have been oriented, as by stretching, and in which the gel structure is extremely compact and cohesive.

A more specific embodiment of my invention is based on my additional discovery that the gel life of a water-swollen, thermoplastic product of polymerization of a polymerizable mass comprising mainly acrylonitrile, more particularly those which have been produced as described in my aforesaid copending application Serial No. 772,200, can be prolonged by contacting such a product with an aqueous solution of a humectant, for instance by immersing the product in an aqueous solution of a humectant comprising a polyhydroxy compound, more particularly a polyhydric alcohol, e. g. diethylene glycol, triethylene glycol, glycerol, diglycerol, etc.

The novel features which are characteristic of my invention are set forth in the appended claims. The invention itself, however, will best be understood by reference to the following more detailed description when considered in connection with the accompanying drawing in which

In carrying my invention into effect a polymer or copolymer (thermoplastic copolymer) of acrylonitrile is prepared in accordance with methods now well known to those skilled in the art. In the preparation of copolymers a mixture of monomers comprising mainly, that is, a preponderant proportion by weight of, acrylonitrile is employed, and preferably the acrylonitrile constitutes at least about 85% by weight of the mixture of monomers. The monomeric mixture should contain substantially more than 50% by weight of acrylonitrile, e. g., from 55 to 99.5% by weight of acrylonitrile. Illustrative examples of monomers which may be copolymerized with acrylonitrile in proportions such as have been mentioned above to form a copolymer, more particularly a thermoplastic copolymer, are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides, methacrylamides, etc.); methacrylonitrile and other hydrocarbon-substituted acrylonitriles; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids.

A suitable method of polymerizing the monomeric acrylonitrile or mixture of monomers is in an aqueous emulsion using a suitable polymerization catalyst, e. g., ammonium persulfate. Other polymerization methods, however, also may be employed, e. g., methods such as those described in Bauer et al. U. S. Patent No. 2,160,054. The polymeric or copolymeric acrylonitrile may be of any suitable molecular weight, but ordinarily will be within the range of 15,000 to 300,000 or higher, as calculated from viscosity measurements using the Staudinger equation (reference: U. S. Patent No. 2,404,713).

The polymeric or copolymeric acrylonitrile is then dissolved in a solvent, more particularly an aqueous solvent, from which the polymer (or copolymer) is precipitated or coagulated when the solution is brought into contact with water, advantageously water which is at a temperature not substantially exceeding +10° C., preferably at or below +5° C., e. g., at from —10° C. to +5° C. Examples of such solvents are concentrated aqueous solutions of water-soluble inorganic salts, more particularly such salts which yield highly hydrated ions in aqueous solution, e. g., the chlorides, bromides, iodides, thiocyanates, perchlorates and nitrates, which salts are disclosed in the aforementioned Rein Patent No. 2,140,921. More specific examples of such water-soluble inorganic salts are zinc chloride, calcium chloride, lithium chloride, cadmium bromide, cadmium iodide, sodium thiocyanate, zinc thio cyanate, aluminum perchlorate, calcium perchlorate, calcium nitrate, zinc nitrate, etc. Other examples of suitable solvents are concentrated aqueous solutions of guanidine thiocyanate, the mono-(lower alkyl)-substituted guanidine thiocyanates and the symmetrical and unsymmetrical di-(lower alkyl)-substituted guanidine thiocyanates. These solutions containing dissolved polymeric or copolymeric acrylonitrile are more fully described and are specifically claimed in my copending application Serial No. 772,201, also filed September 4, 1947, now Patent No. 2,533,224, issued December 12, 1950.

Upon bringing the solution of the polymerization product, e. g., a soluble, thermoplastic product of polymerization of a polymerizable mass comprising at least about 85% by weight of acrylonitrile into contact with water as above described, a water-swollen product having a gel structure and which may have been shaped, as by extrusion, into approximately the desired shape of the ultimate article is formed. This product, preferably after having been molecularly oriented as hereafter described, is then dyed by contacting, as by immersion, the water-swollen mass with an acetate or other dye, more particularly an aqueous solution or dispersion containing the dye. After dyeing, the water-swollen mass is dried, e. g., by allowing it to stand at room temperature (20° to 30° C.) or by heating at an elevated temperature if more rapid drying is desired, for instance at temperatures of the order of 35° to 100° or 110° C. To prolong the gel life of the water-swollen body until a subsequent operation, it may be treated with an aqueous composition comprising a humectant, more particularly an aqueous solution of a water-soluble humectant (examples of which have been given hereinbefore), for instance an aqueous solution containing from about 10 to about 90%, preferably from about 25 to about 50%, by weight thereof of the humectant.

Figure 1:
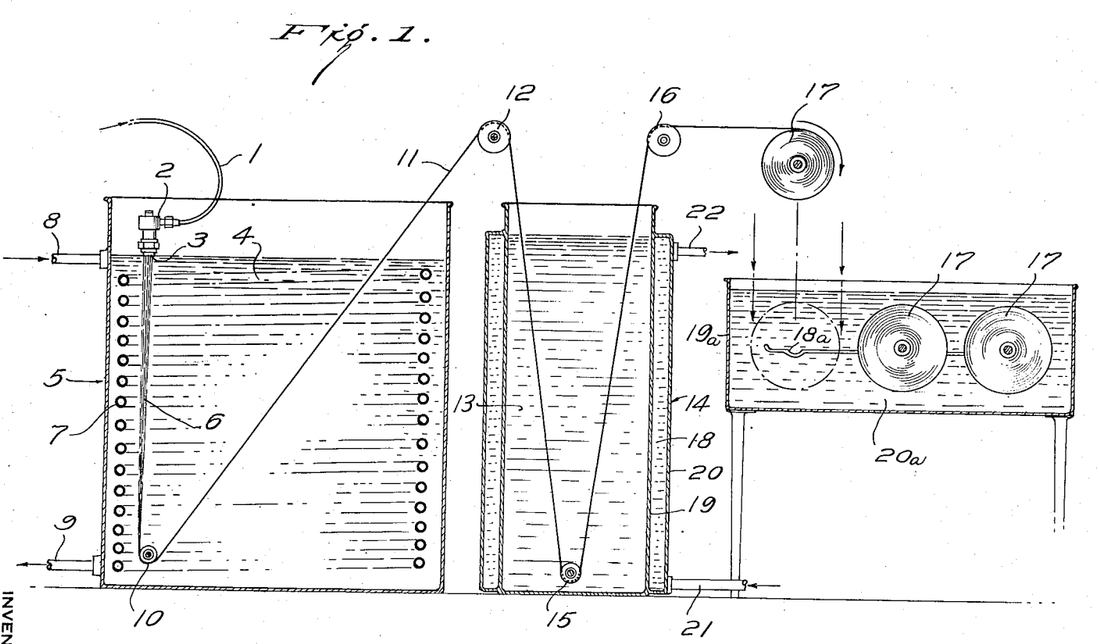
Fig. 1 is a diagrammatic view of apparatus that may be used in practicing the invention and illustrative thereof.
Figure 2:
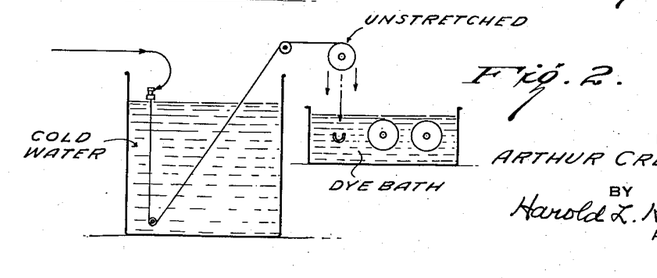
Figs. 2 to 6, inclusive, are somewhat more schematic views illustrating other modifications of the invention.

With reference to the drawing and more particularly to Fig. 1 thereof, a water-coagulable solution of the polymeric or copolymeric acrylonitrile, which has been filtered (if necessary) and de-aerated, is passed under pressure from a supply reservoir (not shown) through the conduit 1 into a spinnerette coupling or heading 2, which preferably is designed so that the solution can be heated, e. g., by electrical or other means, prior to extrusion thorugh the spinnerette 3. A suitable design of the spinnerette coupling is shown in Fig. 2 of the drawing accompanying my aforementioned copending application Serial No. 772,-200. In this device an electrically heated cartridge projects into the cup of the spinnerette, so that the solution is maintained at an elevated temperature prior to extrusion. The temperature of the solution may be varied as desired or as conditions may require, but ordinarily will be within the range of 60° C. to 100° C. By heating the solution immediately prior to extrusion, its viscosity is materially reduced and a substantial reduction in operating pressure is effected. Furthermore, by increasing the fluidity of the solution at the point of extrusion, the water-swollen or gelled filaments can be pulled from the spinnerette at a greater speed, thereby increasing the amount of filament that can be produced from a particular unit.

The spinnerette coupling 2 may be held by suitable means (not shown) above the aqueous coagulating or precipitating bath 4 in vessel 5 at any convenient angle. Good results have been obtained by positioning the coupling vertically as shown in Fig. 1 so that only the face of the spinnerette contacts the coagulating bath.

As the solution is forced under pressure through the openings in the spinnerette, it coagulates or precipitates in the form of solid, water-swollen filaments 6 upon entering the aqueous coagulating bath 4. In order to obtain the preferred water-swollen bodies, more particularly filaments, which are dyed in accordance with the present invention, this bath advantageously is maintained at a temperature not substantially exceeding +10° C. by any suitable means. For example, as shown in Fig. 1, cooling coils 7 through which is circulated a liquid coolant, e. g., a refrigerated brine soltuion, may be employed to maintain the bath 4 at the desired low temperature. This coolant may be introduced through conduit 8 and withdrawn through the conduit 9. It will be understood, of course, that various other means may be used to keep the bath 4 at or below +10° C. For example, instead of employing cooling coils as shown, I may add ice alone, or a mixture of ice and sodium chloride or other salt, or ice and methyl or ethyl alcohol to the bath of liquid coagulant comprising mainly water thereby to reduce the temperature of the bath to the desired point.

The coagulated monofilaments or multifilaments pass through the cold aqueous bath 4, which preferably is of the circulating type so that the filaments will be washed substantially free of salt during passage through the bath. A guide roll or sheave 10 facilitates the passage of the filaments through the coagulating bath.

As indicated hereinbefore, water-swollen bodies having optimum properties are obtained when the coagulating bath 4 is at a temperature not exceeding substantially +10° C., and preferably at or below about +5° C., e. g., —10° C. to 0° or +1° or 2° C. Temperatures below —15° C., e. g., —20° C. or lower, may be employed if desired, but such temperatures are more costly to secure and maintain, and no particular advantages appear to accrue therefrom. By the use of a low-temperature aqueous coagulating bath as herein described, the shaped coagulated or precipitated material, e. g., an extruded, water-swollen or gelled filament, is clear (transparent) or substantially clear, cohesive, has considerable elasticity and toughness, is capable of being oriented, and in either oriented or unoriented state is capable of being dyed with an acetate or other dye. Furthermore, when multifilaments are produced with the aid of a low-temperature coagulating bath as described hereinbefore and in my copending application Serial No. 772,200, the individual water-swollen filaments show no tendency to stick together. This was quite surprising and unexpected, as was also the fact that the swollen or gelled products could be washed substantially free of salt without difficulty, even in a cold coagulating bath, especially in view of the fact that these discoveries are directly contrary to the prior art teachings. For example, in Patent No. 2,404,-716 and in numerous other patents it has been stated that it has been found substantially impossible to use the solutions proposed in Rein Patent No. 2,140,921 in the production of yarns and films, and that their extrusion into coagulating baths, including such non-solvents for acrylonitrile as water, dilute acid solutions, dilute salt solutions, etc., results in the formation of shaped articles that contain large amounts of the inorganic salt component of the solvent. The prior art also teaches that these salts are distributed throughout the structure, that the latter possesses poor physical properties and that the removal of these salts, when possible, results in the formation of a porous, spongy, weak, undesirable structure that is very brittle and completely unsuited for use as a yarn or film. The prior art further teaches that when an attempt is made to form a multifilament yarn by extruding an aqueous sodium sulfocyanide (sodium thiocyanate) polyacrylonitrile composition into a dilute acid bath, the individual filaments that are obtained stick together to form an essentially monofilament structure which is extremely brittle and cannot be bent or worked without breaking. In marked contrast, the films, filaments and other shaped products produced as above described are substantially free from salts, are tough and ductile even when first coagulated in the spinning or precipitating bath, and the individual filaments show no tendency to stick together when extruded through a spinnerette into the cold aqueous bath.

In accordance with the embodiment of the invention shown in Fig. 1 the spun filaments, e. g., in the form of a thread or strand, are treated after leaving the coagulating bath in order to orient the molecules and thereby to increase the tensile strength and otherwise to improve the properties of the spun material. Orientation is preferably effected by stretching the thread or strand, while still in its water-swollen or gel state, in the presence of moisture and at a temperature within the range of about 70° C. to 110° C., more particularly at a temperature of about 90° C. to about 100° C. This stretching may be effected, for example, in the manner illustrated in Fig. 1. As there shown the thread or strand 11 after leaving the aqueous coagulating bath 4 passes over the revolving wheel or godet 12 into the hot aqueous bath 13 contained in vessel 14, thence over the guide roll or sheave 15, over the godet 16 and finally is wound on the spool 17. The revolving wheels or godets 12 and 16 have increasing peripheral speeds so that a tension is applied to the strand as it passes through the bath 13 and as it is wound on the spool 17. Instead of winding upon a spool the stretched strand or thread may be collected in a centrifugal pot, whereby twist is advantageously applied to the wet thread. The amount of stretch that is applied to the water-swollen filament or strand may be varied widely, but in all cases should be sufficient to cause at least appreciable orientation of the molecules and an improvement in the properties of the material undergoing treatment. The amount of tension to which the strand is subjected obviously should not be so great as to cause the strand to break. Depending, for example, upon the type of material being stretched and the particular properties desired in the finished product, the amount of stretch may vary, for instance, from 100%, preferably from 200 or 300%, up to 2000% or more of the original length of the filament or strand. The highly stretched product is strong, tough, pliable, shows a high degree of orientation along the fiber axis by X-ray diffraction methods, is readily fibrillated, and can be tied into a knot without breaking.

The hot aqueous bath 13 is preferably water, and it may be heated to the desired temperature, e. g., 70° to 100° C., by any suitable means. One means of heating this bath is shown by way of illustration in Fig. 1. As there shown, the vessel 14 is provided with a jacket 18 defined by the walls 19 and 20 through which jacket a heating fluid, e. g., superheated steam, hot mineral oil, etc., is circulated, the heating fluid being introduced through conduit 21 and leaving through conduit 22. Electrical or other means also may be used to heat the bath 13. For instance, saturated or superheated steam may be introduced directly into the water through perforated pipes in order to heat the water. Preferably the water in the bath is replaced by fresh water either continuously or intermittently so as to keep to a minimum the amount of salt therein.

The oriented filament wrapped on the spool 17 is then dyed with an acetate or other dye. This may be done, for instance as illustrated in Fig. 1, by placing the spool on a support 18a in the vessel 19a containing the dye bath 20a. The composition of the dye bath and the dyeing procedure are essentially the same as that employed in conventional dyeing practice, more particularly, when an acetate dye is used, essentially the same as that employed in dyeing a cellulose acetate rayon with such a dye. When using, for example, acetate dyes, a neutral dye bath containing a small percentage (e. g., about ¼ to 1%) of water-softening fatty alcohol sulfonates or ester sulfates may be used. The acetate dyes in common use generally have only limited solubility in water. Hence such a dye, which forms a solid solution with the material being dyed, is usually applied in the form of an aqueous dispersion. Dyeing temperatures may vary as desired or as conditions may require, but usually are within the range of 100° to 180° F. (37.7° to 83.2° C.). In some cases, for example with particular dyes or with particular gelled acrylonitrile polymerization products, dyeing advantageously can be effected at room temperature (20°–30° C.) or at a temperature above 180° F., for instance at the boiling temperature of the aqueous dye bath. The impregnation with the dye of the thread package formed by winding upon a spool or collecting in a centrifugal pot may be facilitated by the use of vacuum- or pressure-impregnating technique in known manner or by a combination of vacuum and pressure. For additional information on acetate dyes, including their composition, reference is made to the publication, "Cellulose Acetate—Its Manufacture and Applications," by A. G. Lipscomb, published in 1933 by Ernest Benn Limited (London), pages 241–269, and to the citations therein.

Instead of dyeing the material in filament form as shown in Fig. 1, the monofilament or twisted multifilament thread may be woven into a cloth, ribbon or other form of textile, and the woven material then may be dyed. When this latter procedure is followed, it is important that the gel structure of the filament be not destroyed prior to dyeing. As indicated hereinbefore, the gel life of the filament can be prolonged by treating the filament with an aqueous solution of a humectant, thereby permitting the humectant-treated filament to be twisted, woven or otherwise fabricated prior to dyeing without destruction of the gel structure of the filament or rendering it non-dyeable or difficult to dye.

After dyeing, the dyed water-swollen filament or other structure usually is rinsed in water, which may be hot or cold water, and is then dried.

Classes of dyes that are applicable for use in practicing my invention include direct dyeing dyes, vat dyes, metallized dyes, basic dyes, acid dyes, soluble vat dyes, azoic dyes, acetate dyes, etc.

Illustrative examples of acetate dyes that may be employed are:

| | A. A. T. C. C. Prototype No. |
|---|---|
| Calco Acetate Sapphire Blue 2GS | 228 |
| Calco Acetate Blue G | 225 |
| Calco Acetate Green 2B | 229 |
| Calco Acetate Orange G | 43 |
| Calco Acetate Orange 3RC | 174 |
| Calco Acetate Pink B | 44 |
| Calco Acetate Bordeaux | 238 |
| Calco Acetate Scarlet GC | 63 |
| Calco Acetate Red GG | 236 |
| Calco Acetate Violet B | 175 |
| Calco Acetate Red Violet R | 45 |
| Calco Acetate Yellow 5G | 245 |

Illustrative examples of dyes in other classes are given in examples which follow.

Figs. 2 to 6, inclusive, illustrate other modifications of the invention. Fig. 2 illustrates a method wherein the water-swollen filament is dyed without being stretched to orient the molecules. After dyeing and while the filament is still in a swollen or gel state, it may be stretched to effect orientation and thereby to improve its properties as described above with reference to Fig. 1.

Figure 3:
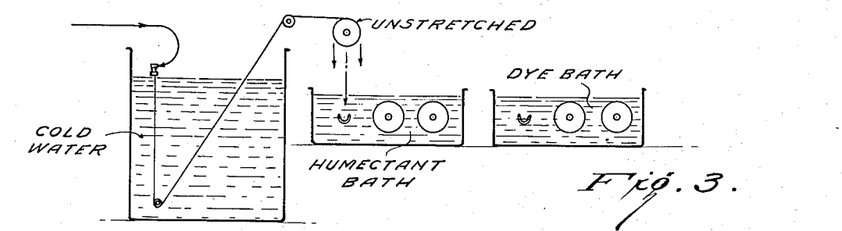

The method illustrated in Fig. 3 differs from that of Fig. 2 in that the water-swollen filament is treated with an aqueous solution of a humectant prior to dyeing. Ordinarily the humectant-treated filament is mildly dried, e. g., by allowing the spool on which the filament is wrapped to stand at room temperature, before it is immersed in the aqueous dye bath. Drying in no case should be so severe as to destroy the gel structure of the filament. By treating the unstretched filament with an aqueous solution of a humectant its gel life is prolonged so that more time may elapse before dyeing or other treatment of the material. The dyed filaments may be oriented to improve their properties as described above with reference to Figs. 1 and 2. If desired, the mildly dried, oriented filament may be fabricated, as by weaving, into cloth or other articles prior to dyeing.

Figure 4:
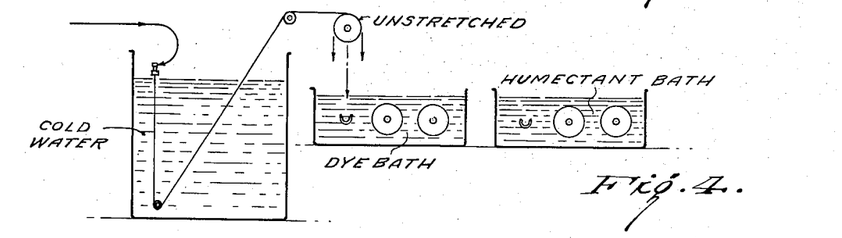

The method illustrated in Fig. 4 differs from that of Fig. 2 in that, after dyeing, the water-swollen dyed filament is treated with an aqueous solution of a humectant. The dyed, humectant-treated filament, which may or may not have been mildly dried, then may be stretched to orient the molecules as hereinbefore described. During the stretch in hot water, the humectant is dissolved out of the filament.

Figure 5:
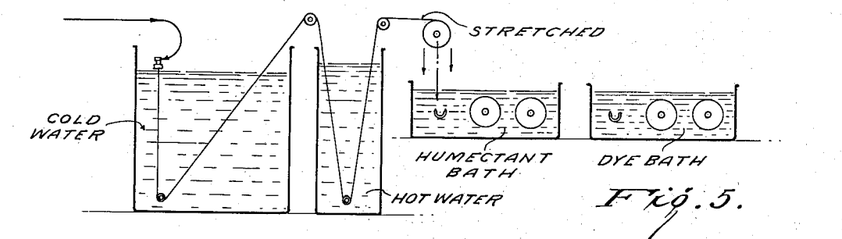

The method illustrated in Fig. 5 differs from that of Fig. 1 in that the oriented filament is treated by immersing the spool on which the filament is wrapped in an aqueous solution of a humectant. After mildly drying the humectant-treated filament, it is then dyed with an acetate or other dye as previously has been described. If desired, the mildly dried, humectant-treated filament may be twisted, woven and the woven fabric then dyed, either with or without water washing of the fabric to remove the humectant prior to dyeing the fabric. Water washing to remove the humectant prior to dyeing the wet material avoids accumulation of the humectant in the dye bath.

Figure 6:
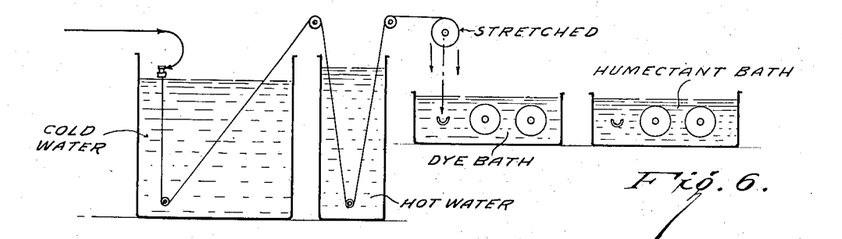

The method illustrated in Fig. 6 differs from that of Fig. 1 in that the dyed, oriented filament is treated with an aqueous solution of a humectant.

The humectant treatment of the polymeric or copolymeric acrylonitrile in water-swollen or gel (aquagel) state prolongs the gel life of the polymerization product in film, filament or other form and makes possible the dyeing of the material with an acetate or other dye under conditions which result in much less, if any, dyeing of the completely dried material, that is, material in which the gel structure has been substantially completely destroyed. As has been mentioned hereinbefore, the treatment with an aqueous solution of a humectant is applicable either to the water-swollen or gelled, stretched or unstretched polymerization product in film, filament or other form.

Various methods may be employed in contacting the water-swollen polymerization product with the humectant depending, for example, upon the shape of the product, the degree of impregnation desired and the manner in which the treated product subsequently is to be processed. For instance, an aqueous solution of the humectant or mixture of humectants may be applied by means of padding rolls, or by brushing, dipping (immersing for a brief period), spraying, etc. The humectant also may be applied in the form of an oil dispersion of the aqueous humectant solution.

The humectant treatment of the undyed or dyed, oriented polymeric or copolymeric polymerization product is useful in facilitating fabrication of the material, as by twisting, weaving, etc. The water-swollen material may be immersed in a bath containing one or more humectants or, in addition thereto, various other modifying agents may be present. For example, the bath also may contain an emulsion of a thread lubricant, e. g., a self-scouring mineral oil. Any suitable emulsifying agent may be used, e. g., a sulfonated fatty oil. Other lubricants or anti-static compounds or compositions similarly may be introduced into the bath containing the humectant, e. g., an emulsion of a reaction product of ethylene oxide and octadecyl guanidine, or of ethylene oxide and octadecyl guanamine, or an emulsion of a long-chain β-alkoxypropionitrile, e. g., octadecoxypropionitrile. These treatments with a combination of a humectant and another modifying agent may be applied to the water-swollen, dyed or undyed, stretched or unstretched polymerization product but preferably are applied to the water-swollen stretched material.

Illustrative examples of humectants that may be used in practicing the present invention are polyhydric alcohols, e. g., ethylene glycol, diethylene glycol, triethylene glycol, glycerol, pentaerythritol, dipentaerythritol, sorbitol, mannitol, neopentyl glycol, dineopentyl glycol, trimethylol propane, trimethylol butane, 1,4-butanediol, hexamethylene glycol, hexaethylene glycol, octaethylene glycol, polyethylene glycol substances having an average molecular weight between about 200 and 4000, e. g., such substances having an average molecular weight of (a) about 200 and comprising mainly tetraethylene glycol, (b) about 300 and comprising mainly hexaethylene glycol, (c) about 400 and comprising mainly nonaethylene glycol, (d) about 1500, (e) about 3000, etc.; sulfonated fatty acid glycerides, e. g., highly sulfonated castor oil; compounds of the kind disclosed in the copending application of John D. Pollard, Serial No. 772,217, filed September 4, 1947; alkanolamines, e. g., triethanolamine, etc.; N-acyl alkanolamines, e. g., N-acetyl ethanolamine, etc.; and others. Some compounds, although considerably less effective than others in preserving the gel structure of the water-swollen polymerization product, have excellent plasticizing action on the material. Examples of such compounds are ethylene cyanohydrin and glycolonitrile. Water-soluble, organic humectants are preferred. Obviously no organic or inorganic humectants which attack the polymerization product should be employed.

The treatment of the water-swollen polymerization product with an aqueous solution of a humectant (or mixture of humectants), e. g., such a solution containing from about 10 to about 90%, preferably from about 30 to about 50%, by weight thereof of the humectant, is an important embodiment of my invention since it makes possible a mild drying, e. g., air-drying, of films, filaments (mono- and multifilaments), bristles, rods, bars, etc., of water-swollen or gelled polymeric or copolymeric acrylonitrile so that they later can be dyed rapidly and effectively with an acetate or other dye. For example, a highly stretched, water-swollen multifilament thread of the polymerization product may be treated with an aqueous solution of a humectant, allowed to air dry, and thereafter may be twisted, wound and then woven, knitted or otherwise worked to form a fabric or other textile material. The fabric then may be treated with an acetate or other dye as hereinbefore described, after which it is washed and dried (or allowed to dry) irreversibly.

In order that those skilled in the art better may understand how the present invention may be carried into effect, the following examples are given by way of illustration and not by way of limitation. All parts and percentages are by weight.

Example 1

Seventeen and one-half parts of a copolymer of approximately 90% acrylonitrile and 10% acrylamide was added to 90.9 parts of a 60% aqueous solution of sodium thiocyanate with stirring. (One gram of this copolymer, dissolved in a 60% sodium thiocyanate solution to make 100 ml. at 20° C., gave a solution having a viscosity of about 23.5 centipoises at 40° C.) All of the copolymer dissolved in the solution, which was warmed to 60° C., in 1 hour. Eight and three-tenth parts of water was added to this copolymer solution over a period of 1 hour with no precipitation, yielding a solution containing about 15% of copolymer dissolved in a 55% aqueous sodium thiocyanate solution. The viscosity of the solution, as determined by measuring the time in seconds for a 1/8 inch Monel metal ball to fall through 20 cm. of the solution at 61° C., was about 305 seconds.

This solution was coagulated to yield a water-swollen film as follows: Nine hundred parts of crushed ice and 450 parts of 2B ethanol were mixed. The temperature was approximately −14° C., warming up to −11° C. when poured into a vessel for use as a coagulating bath. A film of the copolymer was coagulated from a coating of the solution on a glass plate. A water-swollen film having a gel structure was obtained.

Two pieces of the swollen film were stretched fifteen times the original length while immersed in water at 98° C. to 100° C. One piece was dried thoroughly at room temperature (20°–25° C.), yielding a dried film which no longer had a gel structure and was clear, strong and readily fibrillated. Both the dried and the water-swollen, oriented specimens were immersed in an aqueous dye bath containing 0.6 gram per liter each of sodium lignin sulfonate as a dispersing agent and of a blue, acetate dye, more particularly 4-(β-hydroxyethylamino)-1-methylamino anthraquinone, the formula for which is The bath was held at 40° C. for 2½ hours, after which the test specimens were removed, washed with water and allowed to dry at room temperature. The piece which had been added to the bath in water-swollen state was dyed blue, while the piece which previously had been dried before placing it in the bath was not dyed.

Example 2

A solution of about 15.3% of a copolymer of about 90% acrylonitrile and about 10% acrylamide dissolved in an approximately 55% aqueous solution of sodium thiocyanate was extruded through a single-hole, glass spinnerette into circulating water at 3.5° C., thereby coagulating the extruded mass and yielding a water-swollen, unstretched monofilament. A length of this wet monofilament having a diameter of 30 mils was soaked for 2 days in a 50% aqueous solution of glycerol and was then allowed to air dry. The diameter of the air-dried, glycerol-treated filament was 26 to 28 mils. It was clear, transparent, very flexible, quite ductile and could be tied into a knot. By contrast, a section of the water-swollen or wet monofilament which had been allowed to air dry without soaking in an aqueous glycerol solution had a diameter of only 20 mils and was extremely brittle.

A sample of the air-dried, glycerol-treated monofilament and of the air-dried, untreated monofilament were placed in a dye bath containing a dispersion in 40° C. water of 0.6 gram per liter of an acetate blue dyestuff of the same kind used in Example 1. The dyestuff was dispersed in the water by using a small amount of a highly sulfonated castor oil. The samples were allowed to remain in the dye bath, maintained at 40° C., for 3 hours. At the end of this period, the glycerol-treated monofilament was dyed a deep blue whereas the filament which had not been treated with glycerol was undyed. This clearly shows that the treatment of the water-swollen, unstretched (unoriented) filament with an aqueous solution of glycerol had preserved its gel structure and made possible its dyeing with an acetate dye.

After washing in water, the dyed monofilament was divided into two parts. One part was allowed to air dry, while the other again was placed in a 50% aqueous solution of glycerol. After air drying, the washed dyed monofilament was very brittle, indicating that the glycerol had been removed by the washing operation. On the other hand, the dyed glycerol-treated filament was very flexible, showing that the glycerol can re-enter the dyed gel structure and thus replace any glycerol removed in the dye bath.

From this example it will be seen that the gel condition of a hydrated polymerization product of the kind with which this invention is concerned can be prolonged or maintained by treating the gelled product, e. g., by immersion, with an aqueous solution of a humectant. Advantage can be taken of this discovery in facilitating the dyeing of, for example, fabrics made of polymeric or copolymeric acrylonitrile. For instance, after stretching the spun thread to an optimum degree as hereinbefore described in order to orient its molecules and improve its properties, the wet, oriented thread having a gel structure may be treated with an aqueous composition comprising a humectant, more particularly an aqueous solution of a water-soluble organic humectant, either with or without water washing of the oriented thread prior to the humectant treatment as desired or as may be required. The thread then may be allowed (or caused) to air-dry at a relatively low temperature, e. g., at 20° to 60° C., so that the hydrate water of the gel will not be lost. After twisting the thread and constructing the fabric, the latter may be dyed with an acetate dye as hereinbefore described, after which the dyed fabric is washed with water to remove the humectant and free dyestuff and thereafter dried.

Example 3

In this example other humectants were employed in treating the same water-swollen, unstretched monofilament (30 mils in diameter) of a copolymer of acrylonitrile and acrylamide as was used in Example 2, viz., diethylene glycol, triethylene glycol, sorbitol and Carbowaxes 900, 1500 and 4000, which are polyethylene glycol substances having average molecular weights of about 900, 1500 and 4000, respectively. Specimens of the monofilaments were allowed to soak in 50% aqueous solutions of each of the above humectants for about 16 hours, after which they were air dried at 23.9° C. and 38% relative humidity for 2 hours. The dried specimens had the following characteristics:

| Humectant | Diameter of Filament, Mils | Properties of Filament |
|---|---|---|
| Diethylene glycol | 24.5-25 | Clear, flexible, ductile, could be knotted. |
| Triethylene glycol | 25-26 | Do. |
| Sorbitol | 25-27 | Do. |
| Carbowax 900 | 25-26 | Do. |
| Carbowax 1500 | 25-26 | Do. |
| Carbowax 4000 | 25-26 | Flexible, could be knotted, less ductile than other specimens, greasy feel due to wax on surface. |

For comparative purposes, a piece of untreated monofilament was allowed to dry from the gel state for 30 minutes under the same temperature and humidity conditions. At the end of this period the filament was dry and brittle and had a diameter of 19-20 mils.

The air-dried, humectant-treated filaments were dyed in the same manner and with the same acetate dye employed in Examples 1 and 2. All were effectively dyed blue and all apparently to the same depth.

Example 4

The same water-swollen, unstretched monofilament of copolymer which was employed in Examples 2 and 3 also was used in this example. After soaking in the humectant solutions and concentrations thereof shown below for 18-20 hours, the monofilaments were removed from the bath, wiped and then air-dried in a mild current of air at 22.8° C. and 26% relative humidity for 1½ hours. A sample of the untreated monofilament was dry after drying in this manner for only 30 minutes. It was clear, brittle and had a diameter of 20 mils. The properties of the humectant-treated filaments are shown below:

| Test No. | Humectant Bath | Diameter of Dried Filament, Mils | Properties |
|---|---|---|---|
| 1 | 50% aqueous urea | 28-29 | White, opaque, highly flexible, ductile. |
| 2 | Aqueous solution of 30% urea and 20% glycerol. | 26 | Whitish, opaque, highly flexible, ductile. |
| 3 | Aqueous solution of 20% urea and 30% glycerol. | 25-26 | Clear, highly flexible, ductile. |
| 4 | 50% dispersion of highly sulfonated castor oil in water. | 22.5-23 | Do. |
| 5 | 10% aqueous glycerol | 20.5 | Clear. |
| 6 | 30% aqueous glycerol | 23 | Clear, highly flexible, ductile. |
| 7 | 50% aqueous ethylene cyanohydrin. | 22 | Clear, highly flexible, very ductile. |
| 8 | 10% aqueous diglycerol. | 21 | Clear. |
| 9 | 50% aqueous diglycerol. | 26 | Clear, highly flexible, ductile. |

The mildly dried, humectant-treated monofilaments were then placed for 3 hours in a 40° C. dye bath containing 0.6 gram per liter of the same acetate blue dyestuff used in the prior examples and a small amount of highly sulfonated castor oil, after which they were removed from the bath, washed and air dried. The results were as follows:

| Specimen of Test No. | Color of Dyed Filament |
|---|---|
| 1 | Dark blue. |
| 2 | Do. |
| 3 | Do. |
| 4 | Slightly lighter blue than 1, 2 and 3. |
| 5 | Lighter blue than 4. |
| 6 | Same as 4. |
| 7 | Very pale blue. |
| 8 | Same as 5. |
| 9 | Dark blue. |

From the foregoing it will be noted that the order of dye take-up is as follows:

Specimens
Darkest _______________________ 1, 2, 3 and 9
Slightly less ___________________ 4 and 6
Lighter ________________________ 5 and 8
Lightest _______________________ 7

All of the humectant-treated filaments were dyed in varying depths of color. In marked contrast, the air-dried filament which had not been treated with a humectant, when immersed in the same dye bath for the same period of time, remained undyed.

Although ethylene cyanohydrin is less effective than the other humectants tested in this example for maintaining the gel structure and improving the dye affinity of the copolymeric material, it surprisingly has a remarkable plasticizing action upon the filament so that a product having unusually high ductility is obtained. This is a phenomenon which aparently is more than a matter of mere swelling, since monofilaments which had been treated with 10% aqueous glycerol or diglycerol, although having a slightly smaller diameter, nevertheless dyed slightly darker than the ethylene cyanohydrin-treated filament.

The treatment of water-swollen polymerization products of the kind with which this invention is concerned with aqueous solutions containing urea is more fully described and is specifically claimed in the copending application of John D.

Pollard, Serial No. 772,217, filed September 4, 1947.

Example 5

Same as Example 4 with the exception that the water-swollen filaments were immersed for 17 hours in the humectant solutions shown below, and the treated filaments were air dried in a mild current of air at 27.8° C. and 33% relative humidity for 1½ hours. The properties of the humectant-treated filaments are shown below:

| Humectant Bath | Diameter of Dried Filament, Mils | Properties |
|---|---|---|
| Aqueous solution of 15% triethylene glycol and 15% urea. | 23 | Clear, flexible, ductile. |
| Aqueous solution of 20% triethylene glycol and 20% urea. | 24-25 | Clear, flexible, more ductile than previous specimen. |
| Aqueous solution of 25% triethylene glycol and 25% urea. | 26 | Slightly opaque, flexible, ductile. |
| 30% aqueous triethylene glycol. | 23 | Clear, flexible, ductile. |
| 40% aqueous triethylene glycol. | 24 | Do. |
| 50% aqueous triethylene glycol. | 25.5-26 | Clear, flexible, highly ductile. |

All the samples were dyed a dark blue, which appeared to be of equal depth, using the same dye bath and procedure described in the prior example.

The gel-state polymerization products in monofilament or other form are, in general, quite ductile after having been treated with an aqueous solution of a humectant or a plasticizer, which latter may be one that also is a humectant. For instance, a piece of unoriented monofilament of a copolymer such as was used in Example 2 and which had been treated (by immersion) in the wet gel state with an aqueous solution of 20% triethylene glycol and 20% urea was drawn at room temperature several times its original length, and thereafter dried in air. The air-dried monofilament was then soaked in water to remove the triethylene glycol and urea, and allowed to air dry again. Both the drawn (8 mils diameter) and undrawn (20 mils diameter) sections were clear after drying, but whereas the undrawn section was extremely brittle, the drawn section was highly flexible and could be tied in a sharp knot or folded sharply at 180° without breaking. The tenacity of the drawn section was quite good.

The dyed or undyed, water-swollen polymerization products, e. g., in filament form, and which may have been stretched as much as possible in hot water without breaking, may be soaked in an aqueous solution of glycolonitrile, ethylene cyanohydrin, or other plasticizer or plasticizer-humectant, and thereafter dried. The dried filament may be further elongated, e. g., in a hot environment such as in a current of hot air, after which the plasticizer is washed out by immersing the stretched filament in hot water, and the washed filament thereafter dried. This same procedure may be followed in the processing of other forms of dyed or undyed, water-swollen, polymeric or copolymeric acrylonitrile, e. g., such products in the form of films, sheets, rods, bars, tubes, etc.

Example 6

An interpolymer of acrylonitrile and acrylamide was prepared by dissolving 198 parts of acrylonitrile in 2190 parts of water to which had been added 228.5 parts of a 9.64% aqueous acrylamide solution. The temperature of the solution was brought to 40° C. and then 5 parts of sodium metabisulfite was added, followed by 5 parts of ammonium persulfate. By external cooling, the reaction temperature was held to a maximum of 41.4° C., after which the temperature returned to 40° C. at the end of 40 minutes. The mixture was stirred at 40° C. until the total reaction time was 2 hours. The precipitated copolymer of 90% acrylonitrile and 10% acrylamide was filtered off, washed and dried. One gram of this copolymer, dissolved in 60% sodium thiocyanate to make 100 ml. of solution at 20° C. gave a solution having a viscosity of 17 centipoises at 40° C.

Twelve and two-tenths parts of the dry, powdered copolymer was dissolved in 87.8 parts of 55% aqueous sodium thiocyanate solution. The ball-fall viscosity of the resulting solution at 61° C. was 56 seconds. The filtered and de-aerated solution was extruded through a 40-hole spinnerette with 90-micron holes, the spinnerette being attached to an electrically heated coupling; the temperature of the solution inside the spinnerette was 60° C. By contacting the face of the spinnerette with the surface of the coagulating bath, which was water at 4° C., the extruded multifilament thread was spun vertically downward to a roller and thence back to the surface of the coagulating bath, giving a bath travel of 36 inches. The thread was wrapped 2½ times around a godet, the surface speed of which was 1.38 meters per minute. The thread was then passed through a water bath at 95° C. for a travel of 24 inches and thence to a second godet, the surface speed of which was 17.9 meters per minute; the thread was consequently stretched 13-fold in the hot water. The stretched thread was wound on a bobbin while still wet, and a spray of water was maintained on the bobbin to prevent any drying out of the thread.

A spool containing some of the 40-filament thread in wet, gel state was soaked for 6 hours in a 50% aqueous solution of triethylene glycol, after which it was allowed to air dry for about 16 hours.

A small skein of the air-dried, triethylene glycol-treated thread and another skein of wet, stretched thread that had been stored under water after having been spun and stretched were placed in an acetate dye bath containing a dispersion of 0.5 gram per liter of an acetate dye and a small amount of highly sulfonated castor oil. After remaining in the dye bath, maintained at 39° C., for 5 hours the skeins were removed, well washed with de-ionized water and then dried at 60° C. Both skeins were dyed a brownish purple color. The sample which had been treated with the aqueous triethylene glycol appeared to have been dyed somewhat darker than the other sample.

A sample of dry thread which had not been treated with aqueous triethylene glycol was immersed for 18 hours in a dye bath of the kind described above. The thread was removed from the bath, washed with cold water and allowed to air dry. The thread was not dyed.

Example 7

Films of polyacrylonitrile which had been cast from aqueous zinc chloride solutions of polyacrylonitrile, coagulated in 10% MgCl₂ solution and then washed zinc-free were dyed in the water-swollen gel condition by immersing for 2 hours at 40° C. in dye baths each containing 0.62 gram per liter each of sodium lignin sulfonate as a dispersing agent and, in one bath, an acetate blue dyestuff of the same kind used in the prior examples, while the other bath contained an acetate orange dyestuff. The washed, water-swollen films were evenly dyed, whereas a dried (ungelled) film of polyacrylonitrile prepared by the same casting method was not dyed.

A piece of the orange-dyed, wet film was stretched under water at 95° C. to 20 times its original length. After drying, the stretched film was colored orange and fibrillated in a similar manner to previously stretched undyed films.

A water-swollen film which had been stretched in water at 95° C. 20 times its original length was immersed in the aforementioned dye bath containing the acetate blue dye. The swollen film was readily and uniformly dyed. However, when the water-swollen, stretched film was dried completely (thereby destroying its gel structure) and then placed in the dye bath, it was not dyed.

*Example 8*

Some monofilament which had been spun from the copolymer described under Example 6 and stretched 1130% in boiling water was used in this test. The stretched monofilament had been stored under water in the gel state.

Small samples of the water-swollen or gelled monofilament were placed in individual dye baths containing each of the following dyes:

1. Calco Acetate Green 2B (A. A. T. C. C. Prototype No. 229)

2. 
4-acetamino-2'-hydroxy-5'-methylazobenzene (an acetate yellow dye)

3. 
4-[di-(β-hydroxyethyl)-amino]-2-methyl-4'-nitroazobenzene (an acetate red dye, A. A. T. C. C. Prototype No. 236)

4. 
1,4,5,8-tetraminoanthraquinone (an acetate blue dye)

The baths were prepared by adding to a weighed amount of each of the dyestuffs a small quantity of highly sulfonated castor oil and water, and forming a paste of the dye. Boiling water was added to the pastes and then the dye dispersions, each of which was equivalent to 0.66 gram per liter of dyestuff, were allowed to cool to 40° C. The dyeing was carried out for 3 hours at 40° C., after which the monofilaments were washed in water and air dried. All of the samples were dyed.

Four specimens of the same stretched monofilament such as was used in the above dye tests were allowed to air dry and then were heated for 1 hour at 60° C. These dried specimens were immersed in each of the dye baths described above. After immersion in the 40° C. bath for 16 hours the samples were removed, water washed, dried in air at 60° C. and then in a 60° C. oven for 1 hour. None of the samples was dyed.

*Example 9*

Samples of the same aquagel monofilament which had been used in Example 8 were immersed in a 50% aqueous solution of triethylene glycol for 1 hour at room temperature. After this treatment the monofilaments were allowed to air dry at 26.6° C. and 40% relative humidity for 18 hours, after which they were heated for 30 minutes at 60° C. They were then dyed as described below.

Dye baths were made from each of the following acetate dyes, the formulas and colors of most of which have been given hereinbefore:

4-(β - hydroxyethylamino) - 1 - methylaminoanthraquinone (A. A. T. C. C. Prototype No. 228)

4-acetamino-2'-hydroxy-5'-methylazobenzene p.p'-Dinitroazobenzene (an acetate orange dye, A. A. T. C. C. Prototype No. 43)

4-[di-(β-hydroxyethyl) - amino] - 2 - methyl- 4'-nitroazobenzene (A. A. T. C. C. Prototype No. 236)

The baths were prepared by pasting 1 part of each dye with small amounts of water and of highly sulfonated castor oil. Thereafter water at 80° C. was gradually stirred in until a total of 1500 parts had been used. This produced dispersions containing approximately 0.66 gram per liter of dye.

After winding the triethylene glycol-treated monofilaments on glass reels they were immersed for 3 hours in the dye baths, which were maintained at 40° C. The wound filaments were washed in water at 60° C. and then were allowed to air dry. The four samples were each dyed to a deep shade.

*Example 10*

The acrylonitrile polymerization product used in this example was a copolymer of 95% acrylonitrile and 5% methyl acrylate. One gram of the dry copolymer, dissolved in a 60% aqueous sodium thiocyanate solution to make 100 ml. at 20° C., gave a solution having a kinematic viscosity of 22.5 centipoises at 40° C., which viscosity corresponds to an average molecular weight of about 78,700. A spinning solution was prepared by adding 817 parts of granulated, undried, centrifuge cake containing 65% of the aforementioned copolymer to 4868 parts of a 53% aqueous solution of sodium thiocyanate. After stirring at room temperature under an atmosphere of nitrogen, a solution having the following characteristics was obtained:

Percent of copolymer __________________ 9.74
Concentration of NaSCN ________percent__ 50
Ball-fall viscosity at 61° C. (determined as described under Example 1) ___seconds__ 26.3

After storage under vacuum until free of bubbles, the solution was extruded at a rate of 4.9 cc. per minute through a spinnerette having 80 holes of 90 microns diameter into a coagulating bath comprising water at a temperature of about +0.5° C. The multifilament thread in gel form was wound back and forth between a submerged power-driven godet and a multigroove roller such that the total length of immersed thread was 13 feet. The thread then was wound twice around another godet which had a surface speed 25% faster than the first godet, following which it was led through a stretch bath of water at 99° C. and thence to a third godet around which the thread was wrapped three times. The surface speed of the third godet was such that the stretch between the first and third godets was 10.15 times. After stretching, the gel thread was wound as swatches on a bobbin which was sprayed with water to prevent drying of the gel. The swatches were spun such that the dry weight of each was approximately 5.1 grams; the approximate denier was 186 and filament number 80, or a filament denier of approximately 2.32.

Some of the gelled swatches were stored under water as spun, the length of these swatches (hereafter designated as 10—A) being 29.5 cm. Some of the remainder were allowed to stand in a 25% aqueous triethylene glycol solution for 24 hours at room temperature, after which they were squeezed to remove excess solution and then allowed to air-dry at room temperature to a constant weight. These swatches are hereafter designated as 10—B. Other swatches were prepared in an identical manner with the exception that the gelled swatches were immersed for 24 hours in 25% aqueous glycerol at room temperature, followed by squeezing and air-drying. These latter swatches are hereafter designated as 10—C. After drying, the average weight of the 10—B and 10—C swatches were, respectively, 7.3 grams and 7.1 grams (climatic conditions of drying 74° F. at 36% relative humidity) and the respective swatch lengths were 28.9 cm. and 28.7 cm.

Swatches 10—A, 10—B and 10—C of this example subsequently were dyed as described in later examples.

Example 11

The acrylonitrile polymerization product used in this example was a product of emulsion polymerization of a mixture of 90% acrylonitrile and 10% allyl alcohol. One gram of the dry copolymer, dissolved in a 60% aqueous sodium thiocyanate solution to make 100 ml. at 20° C., gave a solution having a kinematic viscosity of 23.6 centipoises at 40° C., which viscosity corresponds to an average molecular weight of approximately 82,600. A spinning solution was prepared by adding 570 parts of the dry, pulverized copolymer to 5430 parts of a 47.6% aqueous solution of sodium thiocyanate. After stirring at room temperature under an atmosphere of nitrogen, a solution having the following characteristics was obtained:

Percent of copolymer __________________ 9.87
Concentration of NaSCN _________percent__ 49.5
Ball-fall viscosity at 61° C. (determined as
    described under Example 1) ____seconds__ 22.3

After storage under vacuum until free of bubbles, the solution was extruded at a rate of 5.4 cc. per minute through a spinnerette having 80 holes of 90 microns diameter in the same manner as described under Example 10 with the exception that the stretch was 9.3 times. The swatches of gelled thread, which also were collected as in Example 10, were so spun that the dry weight of each was approximately 5.2 grams; the approximate denier was 200 and filament number 80, or a filament denier of approximately 2.5.

Some of the gelled swatches, 30 cm. in length, were stored under water as spun, and are designated hereinafter as 11—A. Others were allowed to stand in a 25% aqueous triethylene glycol solution for 24 hours at room temperature, followed by squeezing and drying as described under Example 10. These samples are designated hereinafter as 11—B. Others were similarly treated with 25% aqueous glycerol solution, followed by squeezing and drying as in Example 10, these being designated hereinafter as 11—C. After drying at 76° F. and 31% relative humidity to constant weight, the swatches which had been treated with triethylene glycol had an average weight of 9.26 grams while the average weight of the glycerol-treated fibers was 9.64 grams; in each case the lengths were 29.5 cm.

From the bulkiness of the swatches which had been treated with either triethylene glycol or glycerol, and especially from the swatch weights and shrinkage data, it appeared that the fiber spun from the acrylonitrile-allyl alcohol copolymer of this example retained more humectant than the fiber spun from the acrylonitrile-methyl acrylate copolymer of Example 10.

Swatches 11—A, 11—B and 11—C of this example subsequently were dyed as described in later examples.

Example 12

Homopolymeric acrylonitrile was used in this example. One gram of the polymer, dissolved in a 60% aqueous sodium thiocyanate solution to make 100 ml. at 20° C., gave a solution having a kinematic viscosity of 21.4 centipoises at 40° C., which viscosity corresponds to an average molecular weight of about 75,000. A spinning solution was prepared by adding 907 parts of granulated, undried, centrifuge cake containing 58.9% of the polymer to 4373 parts of a 54.1% aqueous solution of sodium thiocyanate. After stirring at room temperature under an atmosphere of nitrogen, a solution having the following characteristics was obtained:

Percent of polymer ____________________ 10.45
Concentration of NaSCN, percent _________ 51.7
Ball-fall viscosity at 61° C. (determined as
    described under Example 1) ____seconds__ 26.0

After storage under vacuum until free of bubbles, the solution was extruded at a rate of 4.45 cc. per minute through a spinnerette having 80 holes of 90 microns diameter in the same manner as described under Example 10 with the exception that the stretch was 10.0 times. The swatches of gelled thread, which also were collected as in Example 10, were so spun that the dry weight of each was approximately 5.0 grams; the approximate denier was 200 and the filament number 80, or a filament denier of approximately 2.5.

Some of the gelled swatches, 30 cm. in length, were stored in water as spun, and are designated hereinafter as 12—A. Others were allowed to stand in a 25% aqueous triethylene glycol solution for 24 hours at room temperature, followed by squeezing and drying as described under Example 10. These samples are designated hereinafter as 12—B. Others were similarly treated with a 25% aqueous glycerol solution, followed by squeezing and drying as in Example 10, these being designated hereinafter as 12—C. After drying at 74° F. and 36% relative humidity to constant weight, the swatches which had been treated with triethylene glycol had an average weight of 8.05 grams and those treated with glycerol 8.4 grams; in each case the lengths were 27.5 cm.

Swatches 12—A, 12—B and 12—C of this example subsequently were dyed as described in later examples.

Example 13

This example illustrates the dyeing of the aforementioned swatches 10—A, 10—B, 10—C, 11—A, 11—B, 11—C, 12—A, 12—B and 12—C with a direct dyeing dye, specifically Calcomine Scarlet B (Color Index No. 382). The aqueous dye bath contained 1% Calcomine Scarlet B and 20% Glauber's salt, each based on the dry weight of the swatches. The ratio of the volume of the bath to that of the swatches was approximately 50 to 1.

In one series of tests all samples were immersed in the dye bath for 30 minutes at the boiling point of the bath. In another series the swatches of wet, gelled fiber (10—A, 11—A and 12—A) were immersed for 30 minutes at 105° F.

All samples were dyed. Best dyeing was obtained on those swatches of gelled fiber (10—A, 11—A and 12—A) which were immersed for 30 minutes in the 105° F. dye bath. When swatches 10—A, 11—A and 12—A were dyed at the boil for 30 minutes, a decrease in color strength was noted, as compared with those dyed at 105° F., and this decrease was more pronounced in the case of 10—A and 11—A than with 12—A. This may be due to migration of the dye in and out of the fiber as the temperature is increased. When dyeing at the boil, swatch 12—A was dyed more intensely than swatches 10—A and 11—A, the intensity of color being almost equal to that obtained when the same swatch was dyed at 105° F.

The swatches of 10—B, 10—C, 11—B, 11—C, 12—B and 12—C (humectant-treated fibers) which were dyed at the boil gave, in general, somewhat lighter colors than swatches 10—A, 11—A and 12—A (wet, gelled fibers) when also dyed at the boil. In this respect, 12—B and 12—C were most heavily dyed, followed by 11—B and 11—C, with 10—B and 10—C the lightest.

When dyeing the wet, gelled fibers at the boil, the greatest loss in luster occurred on swatch 11—A, followed by 12—A, while 10—A appeared to be the best in this respect. No appreciable loss in luster was noted in dyeing 10—A, 11—A and 12—A at 105° F.

Example 14

This example illustrates the dyeing of the aforementioned swatches 10—A, 10—B, 10—C, 11—A, 11—B, 11—C, 12—A, 12—B and 12—C with a soluble vat dye, specifically Calco Soluble Vat Blue 2B (Color Index No. 1184). Dyeing was on a 1% solution basis. The ratio of liquor to yarn was approximately 20-25 to 1. The following procedure was employed:

1. The dye was dissolved in water.
2. The samples were padded with the dye solution for 1 minute at room temperature, followed by skying for 1 minute.
3. Oxidized at 160° F. for 1 minute using 3.6 gms. per 100 cc. of 66° Bé. sulfuric acid and 0.5 gram per 100 cc. of sodium nitrite.
4. Rinsed well in water.
5. Scoured at 160° F. for 10 minutes using a ½% aqueous solution of Duponol W. A. flakes, which is an anionic surface-active agent, more particularly an alcohol sulfate.
6. Rinsed again thoroughly in water.
7. Dried.

All of the samples were dyed. Swatches 12—A, 12—B and 12—C yielded the heaviest dyeings, swatches 11—A, 11—B and 11—C were slightly lighter in shade, while swatches 10—A, 10—B and 11—C gave the lightest dyeings. The wet, gelled fibers (swatches 10—A, 11—A and 12—A) dyed considerably heavier than the humectant-treated fibers (swatches 10—B, 10—C, 11—B, 11—C, 12—B and 12—C).

Example 15

This example illustrates the dyeing of swatches 10—A, 11—A and 12—A with a metallized dye, specifically Calcofast W. Blue 2G (Color Index Prototype No. 144). The aqueous dye bath contained 1% of the dye and 4% of 66° Bé. sulfuric acid, each based on the dry weight of the swatches. The ratio of the volume of the bath to that of the swatches was approximately 50 to 1. The swatches were dyed by immersing for 30 minutes in the dye bath heated to 105° F., followed by rinsing and drying. All of the swatches were dyed blue, and all to about the same intensity.

Example 16

This example illustrates the dyeing of swatches 10—A, 11—A and 12—A with a basic dye, specifically Calcozine Green V (Color Index No. 657). The aqueous dye bath contained 1% of the dye based on the dry weight of the swatches. As in Example 15, the ratio of the volume of the bath to that of the swatches was approximately 50 to 1. Dyeing was effected by 30 minutes' immersion in the dye bath heated to 105° F., after which the dyed swatches were rinsed and dried. In all cases good tinctorial values were obtained with insignificant differences, if any, between the individual, dyed swatches.

Example 17

This example illustrates the dyeing of swatches 10—A, 11—A and 12—A with an acid dye, specifically Calcocid Scarlet MOO Conc. (Color Index No. 252). The aqueous dye bath contained 1% of the dye, 10% of Glauber's salt and 2% of 66° Bé. sulfuric acid, each based on the dry weight of the swatches. The ratio of the volume of the bath to that of the swatches, the time and temperature of dyeing, as well as the rinsing and drying steps, were the same as in Examples 15 and 16. All of the samples were dyed. Swatch 11—A dyed the heaviest, followed closely by 10—A, while 12—A gave the lightest dyeing.

The preferred methods of coagulating the aqueous solutions of polymeric or copolymeric acrylonitrile and of orienting the water-swollen or gelled masses in filament or other form are more fully described in my aforementioned copending application Serial No. 772,200. As therein pointed out, a swollen (water-swollen) monofilament or multifilament may be elongated at least about 100%, e. g., from 200 to 4000% or more while passing through water maintained at 90° to 100° C. thereby to obtain a filament having increased strength and toughness and which shows orientation along the fiber axis when examined by X-ray diffraction methods.

The water-coagulable solution of the polymeric or copolymeric acrylonitrile may be extruded in the form of rods, bars, tubes, straws, thin sheets or ribbons, etc., into a cold aqueous coagulating bath, the temperature of which preferably does not exceed substantially +10° C., and the precipitated product then may be subjected to tension, e. g., by wet stretching as described above and in my copending application Serial No. 772,200, in order to improve its properties. Or, a cast film may be produced, for example by applying to a metallic or other base, e. g., a metal roll, a coating of a viscous, water-coagulable solution of the polymerization product, contacting the coated base with a cold liquid coagulant comprising mainly water thereby to form a solid, removable film of a gel of the polymerization product on the base, and then removing the film from the base. The liquid coagulant preferably is at a temperature not substantially exceeding +10° C., e. g., from −15° C. to +5° C. or +10° C. The film of gelled material obtained in this way is transparent or substantially so, has considerable (marked) elasticity and toughness, and can be wet stretched under tension in a manner similar to that described above with reference to the stretching of a filament or thread in order to increase its tensile strength and other properties. The wet-stretched product has a permanent orientation. For example, a film of gelled polyacrylonitrile which had been stretched 200% of its original length showed a shrinkage of only 6 to 8% after immersion in boiling water for 15 minutes.

It also will be understood by those skilled in the art that the solution of the polymeric or copolymeric acrylonitrile in the chosen solvent should be of such a concentration that a composition having a workable viscosity is obtained. The concentration of the polymerization product will depend, for example, upon the particular solvent and extrusion apparatus employed, the type of shaped article to be formed and the molecular weight of the polymerization product, which usually is within the range of 15,000 to 300,000, as calculated from viscosity measurements using the Staudinger equation, and advantageously is of the order of 35,000 or 40,000 to 140,000 or 150,000. The concentration of polymer or copolymer may range, for example, from 7 or 8% up to 18 or 20% by weight of the solution. The viscosity of the solution, as determined by measuring the time in seconds for a ⅛-inch Monel metal ball to fall through 20 cm. of the solution at 61° C., may be, for instance, from 50 to 500 seconds. It has been found that the best casting or spinning solutions from the standpoint of coagulation and the optimum properties of the precipitated gel are those which contain the highest concentration of polymer and the lowest concentration of zinc chloride, sodium or calcium thiocyanate or other salt of the kinds aforementioned, which concentrations are consistent with solubility and viscosity limitations. A concentration of 15% polymeric or copolymeric acrylonitrile in 50–60% sodium or calcium thiocynate solution has been found to give very satisfactory results. The viscosity of the solution should not be so high that it is difficult to filter or to stir and de-aerate prior to use.

If desired, lubricants, plasticizers or pseudo-plasticizers or other modifiers may be incorporated into the shaped polymeric or copolymeric articles at an appropriate stage in their process of manufacture. A preferred stage at which these various modifiers may be applied is during the gel state of the thread or film. For example, highly stretched multifilament thread may be treated while in this condition with an emulsion or a reaction product of ethylene oxide and octadecyl guanidine alone or in conjunction with an aqueous solution of a polyglycol, e. g., triethylene glycol, or other humectant. In this swollen state the fibers are more receptive to the taking up of an aqueous solution, dispersion or emulsion. Other lubricant or anti-static treatments which may be applied in this manner are emulsions of long-chain β-alkoxypropionitriles, e. g., octadecoxypropionitrile; still another is an emulsion of a reaction product of ethylene oxide and octadecyl guanimine. These lubricants or anti-static compositions may be applied on the gel thread after it has been dyed.

From the foregoing description it will be seen that the present invention produces a dyed, thermoplastic product of polymerization of a polymerizable mass comprising mainly acrylonitrile that is obtained by contacting, as by immersion, a water-swollen mass of the said polymerization product with a dye and partially or substantially completely drying the dyed mass. The invention also produces a water-swollen mass of a thermoplastic polymerization product of the kind just mentioned, e. g., one containing at least about 85% by weight of combined acrylonitrile, which mass is substantially homogeneously and completely impregnated with a dye. Particularly valuable products resulting from the method of the invention are those which comprise a dyed filament, more particularly a dyed oriented filament, of polymeric acrylonitrile or a thermoplastic copolymer thereof. These dyed filaments are obtained, for example, by impregnating a water-swollen filament, specifically a water-swollen oriented filament, of such a polymerization product with a dye, for instance an acetate dye, and drying (usually substantially completely) the dyed filament.

The term "filament" as used generically herein and in the appended claims is intended to include within its meaning both monofilaments and multifilaments.

I claim:

1. The method of producing a dyed, shaped product from a soluble, thermoplastic product of polymerization of a polymerizable mass comprising mainly acrylonitrile, said method comprising precipitating the said polymerization product in approximately its desired shape from a water-coagulable solution thereof by contacting the latter with a liquid coagulant comprising water, said coagulant being at a temperature not exceeding +10° C. and said polymerization product being dissolved in a concentrated aqueous solution of a water-soluble salt which yields highly hydrated ions in aqueous solution thereby to obtain a shaped, tough, dyeable gel which can be molecularly oriented by wet stretching and which has better dye receptivity than the dried gel in which the gel structure has been destroyed; dyeing the said tough, dyeable gel; and drying the dyed gel.

2. A method as in claim 1 wherein the thermoplastic polymerization product is polymeric acrylonitrile.

3. The method which comprises extruding a viscous, water-coagulable solution of a thermoplastic product of polymerization of a polymerizable mass comprising at least about 85% by weight of acrylonitrile, said polymerization product being dissolved in a concentrated aqueous solution of a water-soluble metal salt which yields highly hydrated ions in aqueous solution, immediately after extrusion immersing the extruded mass in a liquid coagulant comprising mainly water, said coagulant being at a temperature within the range of −15° C. to +10° C., thereby to obtain an extruded transparent gel having considerable elasticity and toughness, stretching the extruded gel at least about 100% while immersed in water at a temperature within the range of about 70° C. to about 100° C., and dyeing the stretched gel.

4. The method of producing a dyed, shaped product from a soluble, thermoplastic product of polymerization of a polymerizable mass comprising at least about 85% by weight of acrylonitrile, said method comprising shaping a viscous, water-coagulable solution of the said polymerization product dissolved in a concentrated aqueous solution of a water-soluble salt which yields highly hydrated ions in aqueous solution; contacting the shaped mass with a liquid coagulant comprising water, said coagulant being at a temperature not exceeding +10° C., thereby to precipitate the said polymerization product from the said solution in the form of a dyeable aquagel having better dye receptivity than the dried aquagel in which the gel structure has been destroyed; dyeing the dyeable aquagel with a direct dye; and drying the dyed aquagel.

5. The method of producing a dyed filament of a thermoplastic acrylonitrile polymerization product which is constituted of at least about 85% by weight of combined acrylonitrile, said method comprising extruding in the form of a filament a viscous, water-coagulable solution of an undyed thermoplastic acrylonitrile polymerization product constituted of at least 85% by weight of combined acrylonitrile, said undyed polymerization product being dissolved in a concentrated aqueous solution of a water-soluble salt which yields highly hydrated ions of aqueous solution, and said viscous, water-coagulable solution being extruded into a liquid coagulant comprising mainly water, said coagulant being at a temperature within the range of −15° C. to +10° C., thereby to obtain a tough, stretchable, dyeable gelled filament having better dye receptivity than the dried gel in which the gel structure has been destroyed; stretching the said gelled filament in contact with moisture at a temperature within the range of about 70° C. to about 110° C. thereby to orient the molecules of the said acrylonitrile polymerization product along the fiber axis; immersing the stretched filament while still in gel state in an aqueous dye bath thereby to dye the said filament; and drying the dyed, gelled filament.

6. The method of producing a dyed, shaped product from a soluble, thermoplastic product of polymerization of a polymerizable mass comprising mainly acrylonitrile which comprises (1) precipitating the said polymerization product as a gelled mass in approximately its desired shape from a water-coagulable solution containing the said product dissolved in a concentrated aqueous solution of a water-soluble thiocyanate, said precipitation being effected by contacting the said solution with a liquid coagulant comprising water, said coagulant being at a temperature not substantially exceeding +10° C., and the precipitated product being a dyeable aquagel having better dye receptivity than the dried gel in which the aquagel structure has been destroyed, (2) stretching the precipitated product in gel state in the presence of moisture and at a temperature within the range of about 70° C. to about 110° C., (3) immersing the undried, stretched product in an aqueous dye bath and (4) drying the dyed, gelled product.

7. A method as in claim 6 wherein the thermoplastic polymerization product is polymeric acrylonitrile.

8. A method as in claim 6 wherein the thiocyanate is calcium thiocyanate.

9. The method of producing a dyed, shaped product from a soluble, thermoplastic product of polymerization of a polymerizable mass comprising mainly acrylonitrile which comprises (1) precipitating the said polymerization product as a gelled mass is approximately its desired shape from a water-coagulable solution containing the said product dissolved in a concentrated aqueous solution of a water-soluble thiocyanate, said precipitation being effected by contacting the said solution with a liquid coagulant comprising water, said coagulant being at a temperature not substantially exceeding +10° C., and the precipitated product being a dyeable gel having better dye receptivity than the dried gel in which the gel structure has been destroyed, (2) immersing the precipitated product in an aqueous dye bath, (3) stretching the undried, dyed product in gel state in the presence of moisture and at a temperature within the range of about 70° C. to about 110° C., and (4) drying the dyed, stretched, gelled product.

10. A method as in claim 9 wherein the thermoplastic polymerization product is polymeric acrylonitrile.

11. A method as in claim 9 wherein the thiocyanate is calcium thiocyanate.

12. The method of producing a dyed, extruded, acrylonitrile polymerization product which comprises (1) extruding a viscous, water-coagulable solution of a thermoplastic product of polymerization of a polymerizable mass comprising at least about 85% by weight of acrylonitrile, said polymerization product being dissolved in a concentrated aqueous solution of a water-soluble salt which yields highly hydrated ions in aqueous solution, (2) immediately after extrusion immersing the extruded mass in a liquid coagulant comprising mainly water, said coagulant being at a temperature within the range of −15° C. to +10° C., thereby to obtain an extruded gel having better dye receptivity than the dried gel in which the gel structure has been destroyed, (3) contacting the said gel with an aqueous composition comprising a humectant thereby to prolong its gel life, (4) dyeing the humectant-treated gel, and (5) drying the dyed gel to an irreversible form.

13. The method which comprises bringing a viscous, water coagulable solution containing a thermoplastic product of polymerization of a polymerizable mass comprising at least about 85% by weight of acrylonitrile into contact with a liquid coagulant comprising mainly water, said polymerization product having a molecular weight of between 15,000 and 300,000 as calculated from viscosity measurements using the Staudinger equation, and being dissolved in a concentrated aqueous solution of a water-soluble salt which yields highly hydrated ions in aqueous solution, and said coagulant being at a temperature with the range of −15° C. to +10° C., thereby to precipitate the said polymerization product from the said solution as a transparent, dyeable gel having considerable elasticity and toughness, as well as better dye receptivity than the dried gel in which the gel structure has been destroyed; stretching the said gel while in contact with water at a temperature within the range of about 70° C. to about 100° C. to cause orientation of the molecules of the said polymerization product; and prolonging the gel life of the said dyeable gel until it is subsequently dyed by contacting the said gel with an aqueous composition comprising a humectant.

14. The method which comprises (1) extruding in the form of a filament a viscous, water-coagulable solution of a thermoplastic product of polymerization of a polymerizable mass comprising at least about 85% by weight of acrylonitrile, said polymerization product being dissolved in a concentrated aqueous solution of a thiocyanate, (2) immediately after extrusion immersing the extruded filament in a liquid coagulant comprising mainly water, said coagulant being at a temperature within the range of −15° C. to +10° C., thereby to obtain a swollen filament having a gel structure and better dye receptivity than the dried gel in which the gel structure has been destroyed, (3) immersing the swollen filament in an aqueous solution of a polyhydric alcohol, (4) mildly drying the polyhydric alcohol-treated filament without destroying the gel structure thereof, and (5) immersing the mildly dried, polyhydric alcohol-treated filament in an aqueous dye bath thereby to dye the said filament.

15. A method as in claim 14 wherein the thermoplastic polymerization product has a molecular weight within the range of from 35,000 to 150,000, as calculated from viscosity measurements using the Staudinger equation, and which includes the additional step of elongating the dyed filament at least about 100% while passing through water maintained at a temperature of 90° C. to 100° C. thereby to obtain a dyed filament having increased strength and toughness and which shows orientation along the fiber axis when examined by X-ray diffraction methods.

16. The method which comprises (1) extruding in the form of a filament a viscous, water-coagulable solution of a thermoplastic product of polymerization of a polymerizable mass comprising at least about 85% by weight of acrylonitrile, said polymerization product being dissolved in a concentrated aqueous solution of a thiocyanate, (2) immediately after extrusion immersing the extruded filament in a liquid coagulant comprising mainly water, said coagulant being at a temperature within the range of −15° C. to +10° C., thereby to obtain a swollen filament having a gel structure and better dye receptivity than the dried gel in which the gel structure has been destroyed, (3) immersing the swollen filament in an aqueous dye bath thereby to dye the said filament, (4) immersing the swollen, dyed filament in an aqueous solution of a polyhydric alcohol, (5) mildly drying the polyhydric alcohol-treated filament without destroying the gel structure thereof, and (6) elongating the mildly dried filament at least about 100% while passing through water maintained at a temperature of 90° C. to 100° C. thereby to obtain a dyed filament having increased strength and toughness and which shows orientation along the fiber axis when examined by X-ray diffraction methods.

17. The method of producing a dyed filament of a thermoplastic product of polymerization of a polymerizable mass comprising at least about 85% by weight of acrylonitrile, said method comprising extruding in filamentary form a viscous, water-coagulable solution of the said polymerization product dissolved in a concentrated aqueous solution of a water-soluble metallic salt which yields highly hydrated ions in aqueous solution; immediately after extrusion immersing the extruded mass in a liquid coagulant comprising mainly water, said coagulant being at a temperature within the range of −15° C. to +5° C. thereby to obtain an extruded dyeable aquagel having considerable elasticity and toughness, as well as better dye receptivity than the dried aquagel in which the aquagel structure has been destroyed; dyeing the said aquagel with a dye effective in dyeing cellulose acetate; and drying the dyed aquagel.

18. The method of producing a dyed, oriented filament of a thermoplastic product of polymerization of a polymerizable mass comprising at least about 85% by weight of acrylonitrile, said method comprising dissolving the said polymerization product in a concentrated aqueous solution of a water-soluble metallic salt which yields highly hydrated ions in aqueous solution; heating the said solution at an elevated temperature sufficiently high to reduce its viscosity; extruding the said solution, while thus being heated, in the form of a filament; immediately after extrusion immersing the extruded mass in a liquid coagulant comprising mainly water, said coagulant being at a temperature within the range of −15° C. to +5° C. thereby to obtain a dyeable, gelled filament having considerable elasticity and toughness, as well as better dye receptivity than the dried gel in which the gel structure has been destroyed; stretching the extruded gel in filamentary form at least about 100% while immersed in water at a temperature within the range of about 70° C. to about 100° C. thereby to cause orientation of the molecules of the said polymerization product along the fiber axis; immersing the stretched, gelled filament in an aqueous bath of a dye effective in dyeing cellulose acetate whereby the said filament is uniformly dyed with the said dye; and drying the dyed, gelled filament to an irreversible form.

19. A method as in claim 18 wherein the stretched, gelled filament prior to immersion in the dye bath is immersed in an aqueous composition comprising a humectant and thereafter mildly dried without destroying the gel structure thereof.

20. A method as in claim 18 wherein the water-soluble metallic salt is calcium thiocyanate and the stretched, gelled filament prior to immersion in the dye bath is immersed in an aqueous solution of a water-soluble humectant comprising a polyhydric alcohol and thereafter mildly dried without destroying the gel structure thereof.

21. The method which comprises extruding a viscous, water-coagulable solution of a thermoplastic product of polymerization of a polymerizable mass comprising at least about 85% by weight of acrylonitrile, said polymerization product being dissolved in a concentrated aqueous solution of a water-soluble metallic salt which yields highly hydrated ions in aqueous solution; immediately after extrusion immersing the extruded mass in a liquid coagulant comprising mainly water, said coagulant being at a temperature within the range of −15° C. to +5° C. thereby to obtain an extruded, dyeable gel having considerable elasticity and toughness, as well as better dye receptivity than the dried gel in which the gel structure has been destroyed; stretching the extruded gel at least about 200% while passing through water maintained at a temperature of 90° C. to 100° C.; dyeing the stretched gel by immersion in an aqueous dispersion of a dye effective in dyeing cellulose acetate, said aqueous dispersion being at a temperature of from 100° F. to 180° F.; and drying the dyed gel to an irreversible form.

22. A method as in claim 21 wherein the aqueous dispersion of dye is an aqueous dispersion of 4 - (β - hydroxyethylamino) - 1 - methyl-aminoanthraquinone.

23. A method as in claim 21 wherein the aqueous dispersion of dye is an aqueous dispersion of 4-acetamino - 2' - hydroxy - 5' - methyl - azobenzene.

24. A method as in claim 21 wherein the aqueous dispersion of dye is an aqueous dispersion of 4 - [di - ($\beta$ - hydroxyethyl) - amino] - 2-methyl-4'-nitro-azobenzene.

25. The method of producing a dyed, oriented, acrylonitrile polymerization product which comprises (1) extruding a viscous, water-coagulable solution of a thermoplastic product of polymerization of a polymerizable mass comprising at least 85% by weight of acrylonitrile, said polymerization product having a molecular weight within the range of 15,000 to 300,000 as calculated from viscosity measurements using the Staudinger equation, being dissolved in a concentrated aqueous solution of a water-soluble thiocyanate and constituting from 7 to 20% by weight of the said solution; (2) immediately after extrusion immersing the extruded mass in a liquid coagulant comprising water, said coagulant being at a temperature not higher than $+10°$ C. thereby to precipitate the said polymerization product in the form of a stretchable gel having better dye receptivity than the dried gel in which the gel structure has been destroyed; (3) stretching the said gel in the presence of moisture and at a temperature within the range of 70° C. to 110° C. thereby to orient the molecules of the said polymerization product; (4) contacting the stretched, dyeable gel with an aqueous solution of a water-soluble humectant comprising a dihydric alcohol; (5) mildly drying the humectant-treated gel without destroying the gel structure thereof; (6) dyeing the resulting dyeable gel by immersion in an aqueous dye bath; and (7) drying the dyed gel to an irreversible form.

26. The method of producing a dyed, oriented filament of an acrylonitrile polymerization product which comprises (1) heating a water-coagulable solution of a thermoplastic product of polymerization comprising at least 85% by weight of acrylonitrile at a temperature within the range of 60° C. to 100° C., said polymerization product having a molecular weight of from 35,000 to 150,000 as calculated from viscosity measurements using the Staudinger equation and being dissolved in a concentrated aqueous solution of calcium thiocyanate, and the said water-coagulable solution of the said polymerization product having a viscosity within the range of from 10 seconds to 500 seconds as determined by measuring the time in seconds for a Monel metal ball having a diameter of ⅛ inch to fall through 20 cm. of the solution at 61° C.; (2) extruding the water-coagulable solution of the said polymerization product, while thus being heated, in the form of a filament; (3) immediately after extrusion immersing the extruded filament in an aqueous coagulating bath maintained at a temperature within the range of $-15°$ C. to $+10°$ C. thereby to precipitate the said polymerization product in the form of a stretchable, dyeable, water-swollen filament having a gel structure and better dye receptivity than the dried filament in which the gel structure has been destroyed; (4) stretching the said filament not less than 100% while passing through water maintained at a temperature ranging between 70° C. and 100° C. thereby to orient the molecules of the said polymerization product along the fiber axis; (5) prolonging the gel life of the said stretched, water-swollen filament until it is subsequently dyed by contacting the said filament with an aqueous composition containing a water-soluble humectant comprising a dihydric alcohol; (6) mildly drying the humectant-treated filament without destroying the gel structure thereof; (7) dyeing the resulting dyeable filament with a direct dye effective in dyeing cellulose acetate; and (8) drying the dyed, gelled filament to an irreversible form.

27. The method of producing a dyed, oriented filament of an acrylonitrile polymerization product which comprises (1) extruding, in the form of a filament, a viscous, water-coagulable solution of a thermoplastic product of polymerization of a polymerizable mass comprising not less than 85% by weight of acrylonitrile, said polymerization product being dissolved in a concentrated aqueous solution of a water-soluble thiocyanate which constitutes from 7% to 20% by weight of the said solution, and the said water-coagulable solution of the said polymerization product having a viscosity within the range of from 10 seconds to 500 seconds, as determined by measuring the time in seconds for a Monel metal ball having a diameter of ⅛ inch to fall through 20 cm. of the solution at 61° C., and being heated to a temperature of from 60° C. to 100° C. immediately prior to extrusion; (2) immediately after extrusion immersing the extruded filament in a liquid coagulating bath comprising water maintained at a temperature within the range of 0° C. to $+5°$ C. thereby to precipitate the said polymerization product in the form of a stretchable, dyeable, water-swollen filament having a gel structure and better dye receptivity than the dried filament in which the gel structure has been destroyed; (3) stretching the said filament not less than 200% while passing through water maintained at a temperature within the range of from 90° C. to 100° C. thereby to orient the molecules of the said polymerization product along the fiber axis; (4) immersing the stretched, water-swollen filament in an aqueous humectant comprising a solution of a dihydric alcohol thereby to prolong the gel life of the said filament until it is subsequently dyed; (5) mildly drying the humectant-treated filament without destroying the gel structure thereof; (6) dyeing the resulting dyeable filament by immersion in a bath comprising an aqueous dispersion of a water-insoluble dye effective in dyeing cellulose acetate, said bath being maintained at a temperature of from 100° F. to 180° F. during dyeing of the said filament; and (7) drying the dyed, gelled filament to an irreversible form.

28. A method as in claim 6 wherein the thiocyanate is sodium thiocyanate.

ARTHUR CRESSWELL.

No references cited.

Certificate of Correction

Patent No. 2,558,735                                                  July 3, 1951

ARTHUR CRESSWELL

It is hereby certified that error appears in the printed specification of the above numbered patent requiring correction as follows:

Column 1, line 24, for "quaterary" read *quaternary*; column 2, line 10, after "e. g." insert a comma; line 15, after the syllable "ularly" strike out the comma; column 3, line 68, after "e. g." insert a comma; column 5, line 1, for "thio cy-" read *thiocy-*; line 53, for "thorugh" read *through*; column 6, line 17, for "soltuion" read *solution*; column 12, line 11, to the right of the formula insert (*A.A.T.C.C. Prototype No. 228*); column 14, line 64, for "aparently" read *apparently;* column 18, line 21, for "p.p'" read *p,p'*; column 19, line 65, after the numeral "10" strike out the semicolon and insert a comma; column 22, line 1, for "11—C" read *10—C*; column 25, line 30, for "of aqueous" read *in aqueous*; column 26, line 3, for "mass is" read *mass in*; line 46, for "water coagulable" read *water-coagulable*; line 58, for "with" read *within*;

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.*